United States Patent
Burke, Jr.

[15] 3,688,570
[45] Sept. 5, 1972

[54] ANGULAR DEFLECTION METER

[72] Inventor: Edward F. Burke, Jr., Reading, Mass.

[73] Assignee: Polaroid Corporation, Cambridge, Mass.

[22] Filed: June 5, 1970

[21] Appl. No.: 43,683

[52] U.S. Cl..........73/136 A, 250/231 SE, 250/237 G
[51] Int. Cl...............................................G01l 3/08
[58] Field of Search.....73/136 A, 70.1; 33/1 L, 1 PT; 250/231 SE, 237 G; 356/169

[56] References Cited

UNITED STATES PATENTS

| | | | |
|---|---|---|---|
| 2,811,853 | 11/1957 | Friedman.................73/136 A |
| 2,886,717 | 5/1959 | Williamson et al........250/237 GUX |
| 2,938,378 | 5/1960 | Canada et al............73/136 A |
| 3,163,037 | 12/1964 | Kawabata.................73/136 A |

FOREIGN PATENTS OR APPLICATIONS 991,782   5/1965   Great Britain...........73/136 A

OTHER PUBLICATIONS

Farrell et al.:" An Automatic Co- ordinate Measuring Equipment Using Moire Fringes," Electronic Engineering, V. 37, Oct. 1965 pp. 644– 651

Primary Examiner—Charles A. Ruehl
Attorney—Brown and Mikulka, William D. Roberson and Frederick H. Brustman

[57] ABSTRACT

A device for indicating axial angular deflection between two elements is shown. In one configuration, two concentric cylinders are used, each having a helical line pattern thereon and each rigidly attached to one of the elements. The outer cylinder is transparent. Optical overlapping of the helical patterns produces axially spaced circumferential Moire fringes. Their axial position is sensitive to the difference in angular rotation between the elements, but insensitive to their rotation together.

11 Claims, 9 Drawing Figures

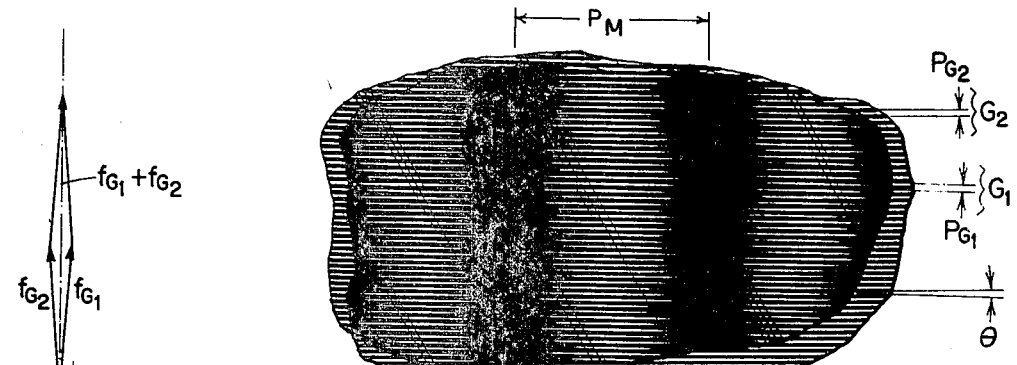
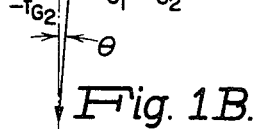
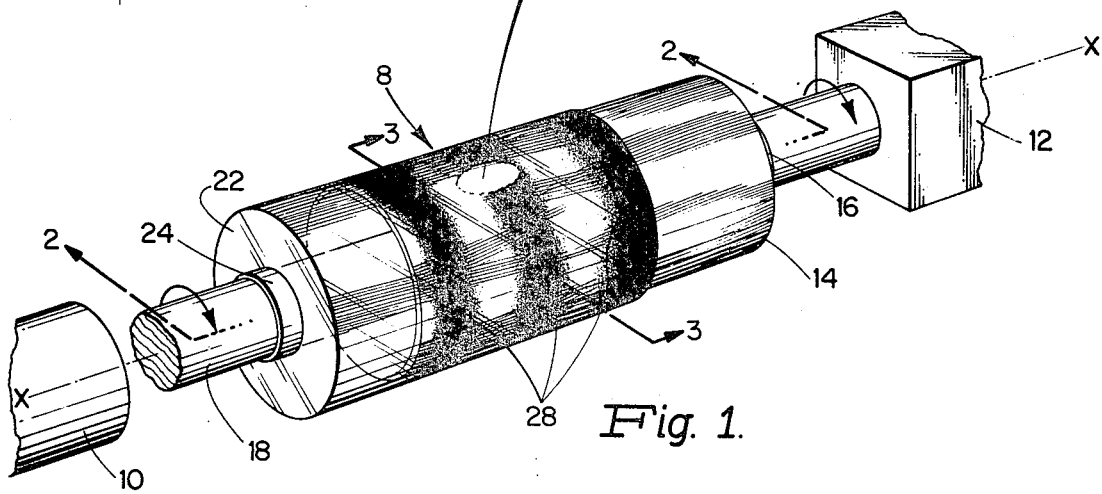
Fig. 1A.
Fig. 1B.
Fig. 1.
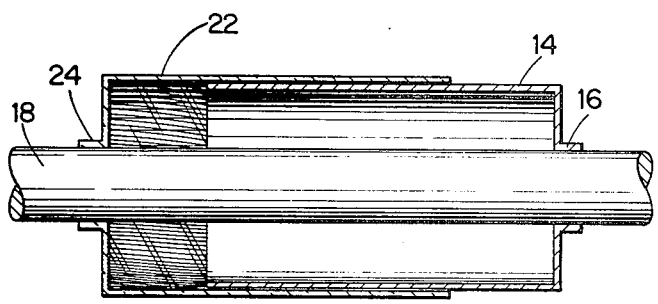
Fig. 2.
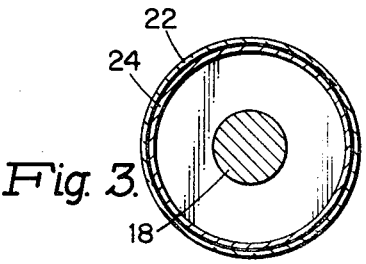
Fig. 3.
INVENTOR
EDWARD F. BURKE, Jr.

PATENTED SEP 5 1972

ANGULAR DEFLECTION METER

BACKGROUND OF THE INVENTION

This invention concerns an angular deflection meter useful, for example, as a static or dynamic torque meter. The difficulties attending the obtainment of accurate measurements of torque in dynamic systems has resulted in a variety of dynamic torque-measuring devices. Commercially available dynamometers of the type which apply a mechanical load to the output shaft of a motor are useful only in applications where the motor is available for testing as an isolated unit, and are totally unsuited for use as on-line torque measuring devices.

A number of patents have appeared disclosing optical torque and power measuring devices which are adapted for obtaining dynamic on-line readings of applied torque. Two such patents are: U.S. Pat. Nos. 2,938,378 — Canada et al., and 3,163,037 — Kawabata. Each of these patents discloses a pair of cooperative optical members respectively secured to spaced shaft elements whose relative angular deflection is to be measured. The optical members rotate with the shafts and are viewed cyclically, e.g., by the use of a shutter or stroboscopic illuminating means.

In the Canada et al. patent the cooperative optical members are radially extending discs each having diffraction gratings thereon. As applied torque causes one of the optical means to rotate relative to the other, a pattern of Moire fringes changing in frequency with applied load are created. This system has a number of deficiencies: (1) because the torque information is sampled only at intervals, rapid torque transients are not detectable; (2) the photoelectric detection means and the processing circuitry associated therewith are complex; (3) the apparatus is bulky in a radial sense and is thus incapable of use in many applications where the required amount of space is not available; (4) the apparatus requires a shuttering means; (5) the system is incapable of being adapted for visual reading; and (6) the system is unsuited for use as a static torque meter.

In the patent to Kawabata the optical members comprise concentric cylindrical shells respectively attached to the shaft elements whose relative angular deflection is to be sensed. Each shell has a longitudinally extending slit, the slits intersecting at an angle to define an angle to define an intersection point whose axial location is a function of the relative angular deflection of the shaft elements. The Kawabata torque meter suffers from being inherently low resolution due to the low information sampling rate, and the lack of any form of torque magnification such as achieved by the Moire fringe arrangement of Canada et al and as taught in a different form by this invention.

OBJECTS OF THE INVENTION

It is an object of this invention to provide a device for measuring and indicating relative angular deflection which is capable of being used without modification in either a static or dynamic state, and which is characterized by extreme simplicity, ease of use, and low cost.

It is another object of this invention to provide such a device which is capable of unusual sensitivity and accuracy and which is adaptable for visual or electronic monitoring.

It is another object to provide a dynamic torque meter capable of accurately sensing and indicating on-line torque induced deflections between two shafts or two elements of a common shaft over a wide range of deflection values.

It is another object to provide a torque meter which absorbs a negligible amount of power from the apparatus being operated upon, and which is readily mountable on the elements whose relative angular deflection is to be sensed.

It is yet another object to provide a torque meter extremely suited for incorporation in automatic process control systems.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a schematic perspective view of an angular deflection indicator constructed according to this invention;

FIG. 1A is an enlarged fragmentary view of a portion of FIG. 1;

FIG. 1B is a Moire fringe vector diagram;

FIG. 2 is a sectional view taken along lines 2—2 in FIG. 1;

FIG. 3 is a sectional view taken along lines 3—3 in FIG. 1;

DESCRIPTION OF THE PREFERRED EMBODIMENTS

Figure 4:
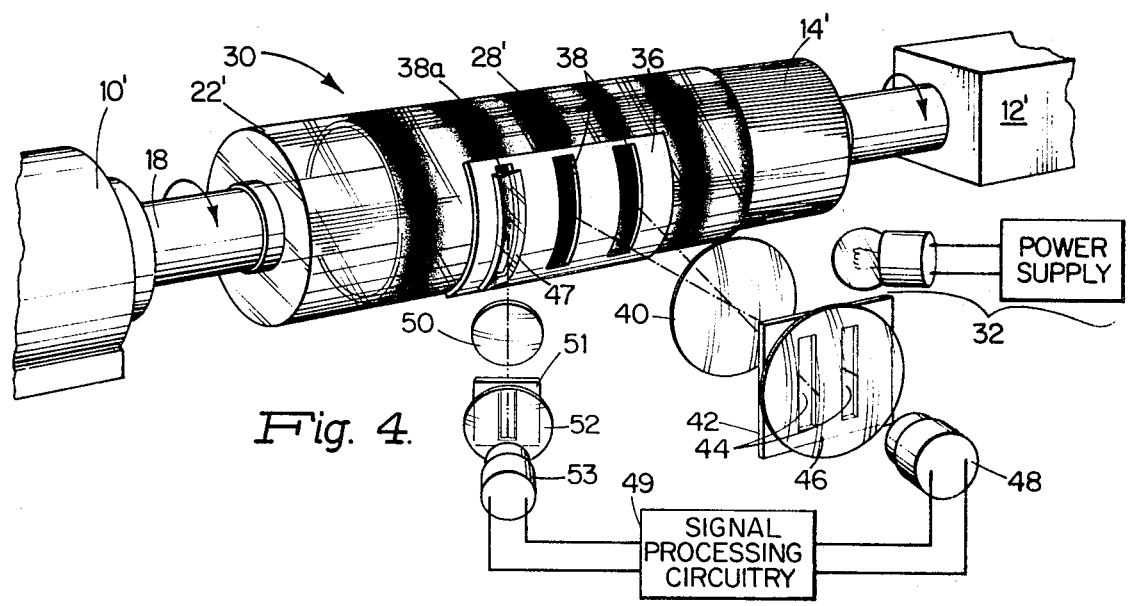
FIG. 4 is a schematic perspective view of an on-line torque or power monitoring systems including a novel dynamic torque meter following the principles of this invention.

This invention exploits the displacement amplification capabilities of a uniquely created system of Moire fringes. In the first-disclosed embodiment (FIGS. 1–3), FIG. 1A illustrates a Moire fringe pattern which might be created by structure following this invention. To insure a complete understanding of the invention before discussing the illustrated embodiments, a brief explanation of Moire fringe phenomena will be first engaged. Reference may be had to FIG. 1A.

It is well known that if a periodic pattern of lines such as a diffraction grating or grid $G_1$ is caused to overlie at an angle a similar grid $G_2$, the grids will interfere to form a visually perceptible system of bands commonly termed "Moire fringes". In FIG. 1A, the repeat cycle or period of the grids $G_1$ and $G_2$ are labeled $P_{G_1}$ and $P_{G_2}$.

The interference of grids $G_1$ and $G_2$ may be analogized to the interaction of sinusoidal electrical signals. If electrical signals of frequencies $f_1$ and $f_2$ are combined, the resultant signals will include a sum signal of frequency $f_1 + f_2$ and a difference signal of frequency $f_1 - f_2$. In radio and television the process of combining signals to derive resultant signals representing the sum and difference of the combined signals is known as heterodyning.

A Moire fringe system represents the vectorial sum and difference of the combined periodic patterns. FIG. 1B is a vector diagram in which $f_{G_1}$ and $f_{G_2}$ are vectors representing the direction and magnitude of the spatial frequencies (the inverse of the periodicities) of grids $G_1$ and $G_2$. The vectorial sum of $f_{G_1}$ and $f_{G_2}$ identifies a periodic Moire fringe pattern having the indicated direction and high spatial frequency. This sum pattern is very difficult to perceive in a fringe system geometry as shown. The dominant Moire pattern is the difference signal $f_{G_1} - f_{G_2}$. This pattern has a very long period $P_M$ (a very low spatial frequency) relative to $P_{G_1}$ and $P_{G_2}$ and is easily seen in FIG. 1A.

It is evident that the angle $\theta$ between the grids $G_1$ and $G_2$ controls the period (the spacing) of the Moire fringes for a given frequency of $G_1$ and $G_2$. The smaller the angle $\theta$, the greater will be the period $P_M$. Thus, the magnitude of $\theta$ may be thought of as determining the magnification factor of the Moire fringe system.

The fringe system has the property that a shift of one period of one of the grids $G_1$, $G_2$ relative to the other causes the Moire pattern to shift in position by one period $P_M$. Thus, the spatial frequency of the grids $G_1$, $G_2$ determines the sensitivity of the system — the finer the lines of grids $G_1$ and $G_2$, the more sensitive will be the system.

This invention exploits the described sensitivity and displacement amplification capabilities of a Moire fringe system as described to provide an angular deflection meter having the above-identified features and capabilities.

FIGS. 1-3 of the drawings show a static or dynamic angular deflection meter 8, useful for example, for measuring torque applied by a motor 10 to a load 12. The meter 8 is illustrated as comprising a first cylindrical shell 14 having a flange 16 secured to a first element of a drive shaft 18. The shell 14 has thereon a periodic grid $G_1$ of alternately highly reflective and highly nonreflective lines following a helical locus around the shell 14. A second cylindrical shell 22 has a flange 24 for securing the shell 22 to a second element of the drive shaft 18 spaced a predetermined distance from the first shaft element engaged by flange 16. The second shell 22 is preferably highly transparent and has thereon a periodic grid $G_2$ of opaque lines following a helical path around the shell 22. The grid $G_2$ has the same periodicity as the grid $G_1$.

As shown particularly in FIG. 1A, the grid $G_2$ is wrapped around shell 22 in the opposite direction from which grid 20 is wrapped around shell 14 and symmetrically therewith, thus causing the grids $G_1$, $G_2$ to form an angle $\theta$ therebetween. Interference of the grids $G_1$, $G_2$ creates a Moire fringe system. The fringe pattern, representing the vectorial difference between grids $G_1$ and $G_2$, is shown as an axial series of circumferential fringes 28.

In the FIG. 1 embodiment which is designed for visual inspection, the angle $\theta$ is preferably very small in order to maximize the periodicity of the Moire fringes 28 and thus enhance their visibility, and also to maximize the magnification of the system. In no event may the angle $\theta$ equal or exceed 45°. If $\theta$ is equal to 45°, the Moire fringe system disappears because the sum fringe pattern at this angle equals the difference pattern and tends to visually neutralize it. For angles of $\theta$ greater than 45°, the axially extending (sum) pattern predominates and the desired circumferential (difference) pattern becomes obscure.

It is also important for dynamic applications that the symmetry of the grids $G_1$, $G_2$ relative to the rotational axis X—X be maintained in order that the fringes 28 lie in planes perpendicular to the axis X—X and thus are insensitive in position and visibility to rotation of the shells 14, 22 together. It is therefore a requirement in the preferred static/dynamic embodiments that the grids $G_1$, $G_2$ each make a like angle of less than 22.5° with respect to axis X—X.

Upon application of torque by the motor 10 to the load 12, the shell 22 (and thus the grid $G_2$ thereon) will rotate according to some transient function with respect to the shell 14, causing the pattern of fringes 28 to move as a unit along the axis X—X according to a function determined by the torque transient. When a steady state driving condition is reached, the pattern of fringes 28 again stabilizes, but at a new axial position. The new position is displaced from the rest position of the fringes 28 a distance directly and closely related to the angular deflection between the shaft elements engaged by flanges 16 and 24, and thus to the torque applied by the motor 10. The frequency of the grids $G_1$, $G_2$ is preferably very high, for example, in the order of thousands of line per inch, whereby the displacement of the pattern of fringes is extremely sensitive to steady state and transient torque applied by the motor 10 to load 12.

It is evident from the extreme compactness and simplicity of the meter, and its near-total freedom from power absorption, that the meter is extremely suited for use in on-line torque monitoring and measuring applications.

FIG. 4 shows an automatic torque monitoring or control system including a novel torque meter 30 constructed according to this invention. In the FIG. 4 embodiment, the torque meter 30 is illustrated as being substantially identical to the meter shown in FIG. 1. Means for monitoring the axial position and motion of the pattern of fringes 28' formed on the torque meter 30 is shown as including a light source 32 for illuminating the pattern of fringes 28'. A photodetection system is illustrated as including a mask 36 having a plurality of slits 38 for reducing noise and enhancing the contrast of the fringes 28'. Imaging means 40 forms an image of the slits 38 on a mask 42 having a similar configuration of slits 44. A field lens 46 collects light transmitted through the slits 44 and forms an image of the aperture of the imaging lens 40 on a photodetector 48. The output from the photosensitive device 48 is fed to signal processing circuitry, shown schematically in block box form at 49.

Time varying changes in the torque applied to the shaft 18 by the motor 10 produces relative angular motion between the cylindrical shells 14', 22', thus causing the axial position of the pattern of fringes 28' to vary in accordance with the applied torque-vs-time function. The movement of the fringes 28' with respect to the mask 36 effects a modulation of the light beam received by the photodetector at 48. The output of the photodetector 48 is an electrical signal whose amplitude as a function of time is directly related to the applied torque function.

In order that the direction of movement of the fringes may be detected, slit 38a has in front of it a neutral density wedge 47 with a shading function which decreases left to right (in FIG. 4). The shaded slit is imaged by a lens 50 onto a slit in a mask 51. A field lens 52 images the aperture of lens 50 upon a photodetector 53, the output of which is supplied to the processing circuitry 49. By this arrangement, the shape of the light pulses received by the photodetector 53 will differ depending upon the direction of fringe movement. The processing circuitry would contain pulse recognition circuits capable of determining the direction of fringe movement.

The output signals from the photodetectors 48, 53 may be utilized in a great many ways dependent upon the particular application and the desired control or monitoring function. For example, the FIG. 4 system might be used to monitor or record applied torque as a function of time. In this application the signal processing circuitry would include an electronic counter which receives an input from photodetector 48 and is capable of counting the number of fringes passing the mask as a function of time. The processing circuitry 49 would combine this information with direction information derived from the output of photodetector 53 to develop a signal characterizing angular deflection, and thus applied torque, as a function of time.

It should be noted that, unlike prior art systems which are capable of sampling net angular deflection only once or a small number of times per shaft revolution, by this invention, net deflection is detected continuously. Thus the achievable temporal resolution and frequency response of a system utilizing this invention is potentially very much greater than prior art systems. Such a system as suggested would be extremely useful in applications where it would be desirable to know immediately a torque or load perturbation such as might be induced by an impending bearing failure. For such use the signal processing circuitry 49 would include an alarm.

In another application the signal processing circuitry might comprise part of a closed loop feedback system feeding a control signal to the motor 10. Such an arrangement could be used as a torque stabilizer. The photodetection system would act to monitor any deviation in the axial position of the pattern of fringes 28' (indicating an incremental change in applied torque). The resultant error signal would be processed and a control signal fed back to the motor 10 to effect a compensation for the sensed torque deviation.

Figure 5:
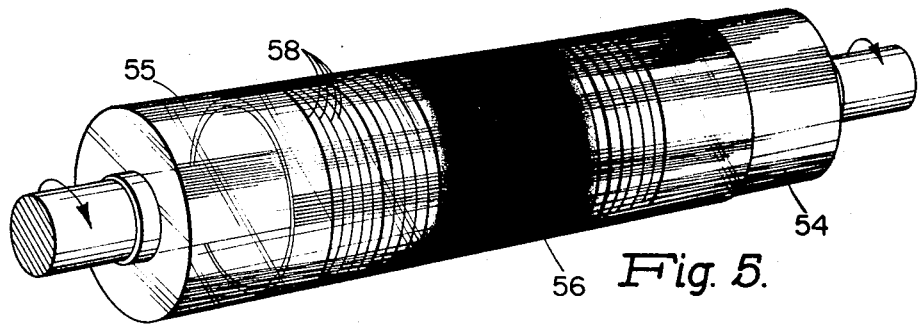
FIG. 5 is a perspective view of a second embodiment of this invention which is capable of being read visually while in either a static or dynamic state.

FIG. 5 illustrates an embodiment of the invention capable of being monitored visually. In this embodiment a periodic grid on each of shells 54, 55 are so angled relative to each other that the fringe period is greater than axial overlap of the shells 54, 55, whereby only one fringe 56 is visible at any given time. The (transparent) outer shell 55 is provided with a graduated scale 58 against which the position of the fringe 56 can be visually related to applied torque.

Figure 6:
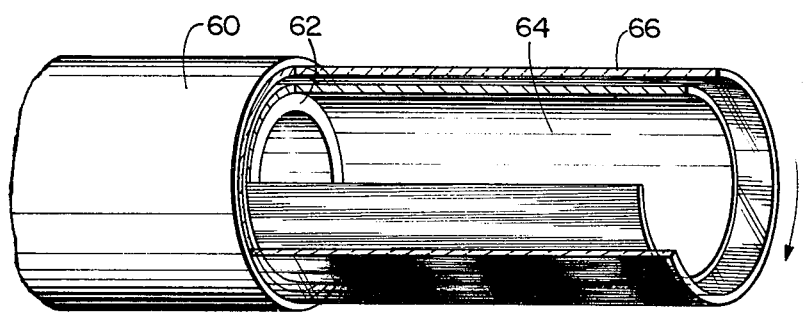
FIG. 6 is a schematic fragmentary perspective view of a third embodiment of the invention capable of indicating angular deflection between concentric elements and FIG. 7 is a schematic view of another embodiment where an optical system superimposes an image of one set of lines onto the other set of lines to create Moire interference fringes.

FIG. 6 is yet another embodiment of the invention useful where it is desired to obtain an indication of relative angular deflection between a pair of coaxial rotating members 60, 62. In FIG. 6 a cylindrical inner shell 64 affixed to the member 62 carries a grid of helically arranged lines which may be as described above with respect to shell 14. Similarly, cylindrical outer shell 66 is transparent having a grid of alternatively transparent and substantially less transparent lines arranged in a helical pattern which is angled with respect to the grid on inner shell 64. In the same manner as discussed above, interference between the grids on the outer and inner shells 64, 66 produces a circumferential pattern of Moire fringes, the axial position of which varies as a function of the relative angular deflection between the members 60, 62.

Figure 7:
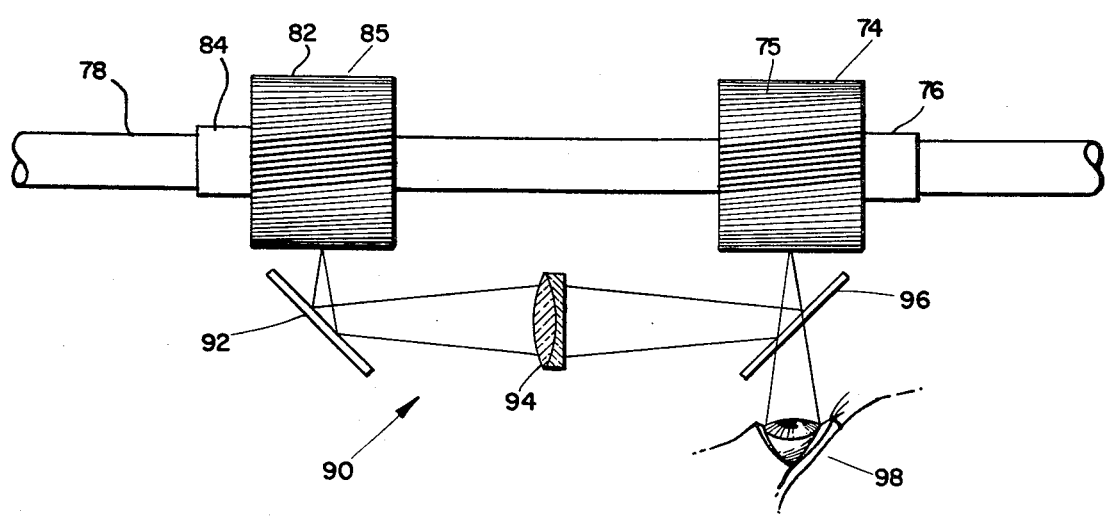

As well known to those skilled in the art of Moire fringes, interference can be established between a periodic pattern and an image of another periodic pattern or between images alone (see, for example, Barber et al., U. S. Pat. No. 3,153,111). Under certain special circumstances, physically overlapping two cylinders with the appropriate helical line patterns might be undesirable. FIG. 7 illustrates an alternate means for establishing Moire interference between the line patterns. A simple optical arrangement forms an image of one line pattern onto the other line pattern producing Moire interference between the image and the pattern. The flanges 76 and 84 connect two short cylindrical shells 74 and 82, respectively, to different elements of a torque shaft 78. The shells 74 and 82 are too short for their respective helical line patterns 75 and 85 to overlap. A stationary optical system 90 forms an image of the helical line pattern 85 onto the helical line pattern 75, thereby producing Moire interference fringes visible on the cylinder 74. In this instance the handedness of the two helical line patterns is the same. An optical reversal in the imaging system 90 will introduce the opposite handedness needed to yield circumferential Moire fringes. A mirror 92 reflects light emanating from the pattern 85 towards a lens 94. The lens 94 refracts the light into an image of the line pattern 85. A beam splitter 96 reflects that image onto the pattern 75. Moire interference occurs between the image of line pattern 85 and the line pattern 75. An observer, represented by an eye 98, can view the resulting Moire fringe through the beam splitter 96. The axial position of the fringe is a function of the torque and/or the relative angular displacement between the cylinders 82 and 74 and, consequently, it can easily be observed without regard to the rotational speed of the torque shaft 18 and the cylinders 74 and 82.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depic-

What is claimed is:

1. A device for indicating relative angular displacement between first and second elements, comprising:
a first cylindrical surface rigidly connected to a first of said elements;
a second cylindrical surface rigidly connected to a second of said elements;
a plurality of parallel helical lines on said first cylindrical surface;
a plurality of non-circumferential parallel lines on said second cylindrical surface; and
means for causing one of said line patterns to optically interfere with the other of said line patterns to create at least one circumferential Moire fringe, the axial position of said fringe varying as a function of the relative rotation between said first and said second elements.

2. The device described in claim 1, wherein said first and said second cylindrical surfaces, together with their respective line patterns, are concentric and one of said first and second cylindrical surfaces is transparent and overlaps the other.

3. The device described in claim 2, further comprising:
torque shaft means, connecting said first and said second cylindrical surfaces and coaxial therewith, for restricting the relative angular displacement between said first and said second elements and for maintaining a predetermined proportionality between a torque applied to opposite ends of said torque shaft means and said relative angular displacement.

4. A meter for indicating the torque between a driving shaft element and a driven shaft element, comprising:
torque shaft means, having an axis, for maintaining a predetermined proportionality between a torque applied to the opposite ends of said torque shaft means and an angular displacement of one of said elements relative to the other end of said elements;
a first cylindrical shell, concentric about said axis, secured to said torque shaft at a predetermined location;
a first pattern of helical lines on said first cylindrical shell, said first pattern having a given handedness;
a second cylindrical shell, concentric about said axis, secured to said torque shaft at a location separated from said predetermined location, said second cylindrical shell being transparent and overlying at least a portion of said first cylindrical shell; and
a second pattern of helical lines on said second cylindrical shell, said second pattern having a handedness opposite that of said first pattern, whereby optical interference between said patterns establishes a system of axially spaced circumferential Moire fringes, the axial position of said Moire fringes being related to the torque applied to said opposite ends of said torque shaft.

5. A meter for detecting and indicating relative angular deflection between first and second elements about a reference axis, comprising:
a first cylindrical shell secured to said first element, said first shell having a first periodic grid of alternately reflective and less reflective lines following a helical locus thereon;
a second cylindrical shell coaxial with said first shell and secured to said second element, said second shell overlying at least a portion of said first shell and having thereon a second periodic grid of alternately transparent and less transparent lines following a helical locus thereon, said second grid being of the same periodicity as said first grid and making an angle of less than 45° therewith, each of said grids making an angle of less than 22.5° with respect to said reference axis, the interference of said grids establishing a system of axially spaced circumferential Moire fringes, the axial location of which system varies as a function of relative rotation between said elements but is insensitive to rotation of said elements together.

6. The meter defined by claim 5 wherein said angle formed by said first and second grids is such that the period of said Moire fringe system is greater than the axial overlap of said first and second grids, whereby at any given time the visible fringe pattern consists of a single fringe.

7. The apparatus defined by claim 5 wherein said meter includes a graduated scale on said second shell against which axial fringe movement can be visually measured and identified with relative angular deflection between first and second shells.

8. A torque meter for producing an indication of torque applied between spaced first and second elements of drive shaft means having an axis, comprising:
a first cylindrical shell disposed on said axis and secured to a first of said elements, said first shell having a first periodic grid of alternately reflective and less reflective lines following a helical locus thereon;
a second cylindrical shell on said axis and secured to said second of said elements, said second shell overlying at least a portion of said first shell and having thereon a second periodic grid of alternately transparent and less transparent lines following a helical locus thereon, said second grid being of the same periodicity as said first grid and making an angle of less than 45° therewith, each of said grids making an angle of less than 22.5° with respect to said axis, the interference of said grids establishing a system of axially spaced circumferential Moire fringes, the axial location of which system varies as a function of relative rotation between said elements but is insensitive to rotation of said elements together.

9. The apparatus defined by claim 8 wherein said angle formed by said first and second grids is such that the period of said Moire fringe system is greater than the axial overlap of said first and second grids, whereby at any given time the visible fringe pattern consists of a single fringe.

10. The apparatus defined by claim 9 wherein said torque meter includes a graudated scale on said second shell against which axial fringe movement can be visually measured and identified with relative angular deflection between said first and second shells.

11. A method for detecting and indicating relative angular deflection between first and second elements about a reference axis, comprising:

rigidly coupling to said first element a first helical grid of periodic lines, said grid having a helix axis;

rigidly coupling to said second element a second helical grid of alternately transparent and substantially less transparent lines which is coaxial with said first grid, said grids being of like periodicity but different orientation;

overlying said second grid on said first grid to create a system of axially spaced circumferential Moire fringes around said helix axis, the axial position of which varies as a function of relative rotation between said elements but is insensitive to rotation of said elements together; and monitoring the position of said fringes to detect relative angular deflection between said first and second elements.

* * * * *